United States Patent [19]

Ericson et al.

[11] Patent Number: 5,916,304
[45] Date of Patent: Jun. 29, 1999

[54] DETECTING AND PROVIDING VISUAL INDICATION OF ERROR IN MANUALLY-ENTERED SERVICE PROFILE IDENTIFIER (SPID)

[75] Inventors: Philip G. Ericson, West Hills; Ray M. Ransom, Big Bear City, both of Calif.

[73] Assignee: Interack Communications, Inc., Camarillo, Calif.

[21] Appl. No.: 08/926,780

[22] Filed: Sep. 8, 1997

[51] Int. Cl.[6] .................................................. G06F 15/177
[52] U.S. Cl. .......................................... 709/222; 379/201
[58] Field of Search .................................. 370/252, 904;
309/93.02, 93.03, 201; 395/200.5, 200.51,
200.52; 709/220, 221, 222

[56] References Cited

U.S. PATENT DOCUMENTS

| | | | |
|---|---|---|---|
| 4,570,035 | 2/1986 | Pinede et al. | 179/99 |
| 4,730,313 | 3/1988 | Stephenson et al. | 371/5 |
| 5,012,466 | 4/1991 | Buhrke et al. | 370/62 |
| 5,157,665 | 10/1992 | Fakhraie-Fard et al. | 371/20.1 |
| 5,386,466 | 1/1995 | Bales et al. | 379/220 |
| 5,390,241 | 2/1995 | Bales et al. | 379/207 |
| 5,535,198 | 7/1996 | Baker et al. | 370/60 |
| 5,574,870 | 11/1996 | Dziennus et al. | 395/309 |
| 5,598,458 | 1/1997 | Bales et al. | 379/58 |
| 5,715,241 | 2/1998 | Glass, III et al. | 370/252 |
| 5,761,293 | 6/1998 | Newlin et al. | 379/230 |
| 5,793,751 | 8/1998 | Baker et al. | 370/250 |

FOREIGN PATENT DOCUMENTS 06-177934  6/1994  Japan .

*Primary Examiner*—Lance Leonard Barry
*Attorney, Agent, or Firm*—Small Larkin, LLP

[57] ABSTRACT

A computer program-implemented Service Profile Identifier (SPID) error identifier and indicator for use in an ISDN terminal access device such an ISDN terminal adapter including a programmable terminal access device programmed to determine, for each SPID entered, whether it is identical to the SPID assigned by the telephone company, and if not, to provide visual indication of an erroneously entered SPID.

10 Claims, 3 Drawing Sheets

DETECTING AND PROVIDING VISUAL INDICATION OF ERROR IN MANUALLY-ENTERED SERVICE PROFILE IDENTIFIER (SPID)

BACKGROUND OF THE INVENTION

A. Field of the Invention

The present invention is directed to a computer program-implemented Service Profile Identifier (SPID) error identifier and indicator, more specifically to a SPID error identifier and indicator for use in an ISDN access device, such an ISDN terminal adapter.

B. Description of the Prior Art

Within the telecommunications industry, the Integrated Services Digital Network (ISDN) has been gaining popularity. However, ISDN has been plagued with configuration complexities which have caused problems with establishing and maintaining a connection between the ISDN equipment usually referred to as customer premises equipment (CPE) of the user, also referred to as the subscriber, and the equipment of the telephone company. These complexities and problems have resulted in significant frustration, particularly to installers.

One type of problem relates to a requirement of the ISDN telephone facility, as it presently exists, that the subscriber's equipment must be programmed with variables that are not necessary for the subscriber to communicate with another end user, yet are required for the subscriber to access the ISDN telephone facility and interoperate with a network switch connected to the subscriber's ISDN equipment through a standard twisted-pair copper wire telephone line. One such variable is the SPID, i.e., Server Profile Identifier.

As is well known, the SPID is typically a number, and is unique to each directory number assigned to the telephone company switch. A SPID is similar to a telephone number, but is not a telephone number. Although the SPID may be alphanumeric, it is typically a number having 1–21 digits, is assigned by the telephone company and is necessary for establishing a connection in North America between an ISDN subscriber's equipment and the telephone company's ISDN switch for each of the directory numbers. For example, using an ISDN switch and with an ISDN connection having two directory numbers, i.e., DN1 and DN2, there would be two telephone company assigned SPID numbers. During use of the telephone network, the SPID is transparent to the subscriber; however, as indicated above, the SPID is a parameter required during conventional terminal initialization. The SPID must be successfully acknowledged by network switching equipment in order to establish a connection. Once the SPID has been accepted by the network it is not used again unless the terminal initialization procedure is repeated. Furthermore, it is not part of the ongoing protocol transactions required to place and receive calls.

Various architectures and formats for SPIDS exist, but all basically involve a way to identify the terminal so that the subscriber's and telephone company's equipment can properly transfer and translate information across the telephone lines. Because of lack of understanding about SPIDs, and because of resistance, primarily by subscribers, to the human error potential associated with SPIDs, a relatively new approach, known as the non-initializing terminal, can establish communication without a SPID. The non-initializing terminal systems are used in Asia and in Europe. It is believed that SPIDS are used only in North American telephone systems.

It is also believed that the SPID is a relic from a by-gone era. Nevertheless, in order to establish and maintain communications in North America, the SPID must be correctly transmitted and received. In North America there are essentially three major switches currently in use: Siemens, Northern Telecom and Lucent Technologies (formerly AT&T).

To establish an ISDN connection in North America, the telephone company assigned SPID number for each directory number for the subscriber's device must be correctly programmed. Programming the SPID is a task normally performed by the installer (user or telephone company agent) during the process of installing the ISDN connection for the subscriber's equipment. Because manual entry of the SPID has the potential for human error, it can be, and often is, mis-typed or mis-entered by the installer. It is this problem of erroneously programmed SPIDs to which the present invention is directed.

One industry reaction in North America to SPID programming problems is a technique referred to as Auto SPID Detect, which is essentially a computer program implemented method by which the installer does not have to manually enter the SPID number. This approach is nothing more than a trial-and-error scheme based on the hope that standardized SPID formats are utilized. If the Auto SPID Detect technique is not successful, the installer is forced to manually enter the SPID, thus defeating the purpose of and devaluing the procedure.

Another industry response in North America to this problem provides for improved SPID implementation and verification through use of computer interfaces, located at the switch and subscriber's equipment, for configuration and status feedback. This response, of course, requires a computer and applicable software to be present at each location for validation. Automatic SPID selection is a downloading procedure or technique where the switching equipment sends the SPID to the ISDN access device, as described in Bellcore Document No. GR-2941-CORE and Lucent Technologies Document No. 235-900-341, Issue 5.00A.

OBJECTS AND SUMMARY OF THE INVENTION

It is an object of the present invention to provide a computer program-implemented means to assist in rapid identification, indication and correction of errors in SPID programming.

Another objective of the present invention is to assist in rapid error identification and elimination with respect to establishing and maintaining an ISDN connection.

In response to the problem described above, the present invention provides a way of identification and indication of an incorrectly entered SPID. The invention is primarily for telephone installers. It enables the installer to quickly identify whether the ISDN SPID have been correctly entered and the ability to modify programmed information as necessary with a telephone or a hand-held "butt set" or other portable equipment. It does not require a computer screen. It does require some external means by which the identified error is indicated. Preferably, a visual indication, such as flashing lights on the face panel of the terminal device itself may be the means by which the error is indicated. Other indications, such as audible sounds of various types, loudness and sequences known in the field of telephony may also be used to provide the indications required by the present invention. This invention is important because SPID numbers are usually 1–21 digits long and can be easily mis-read, mis-entered or mis-keyed.

The present invention provides a solution to one of many things that can go wrong with, or one of many sources of errors that may arise in establishing an ISDN terminal connection. By being able to rule this problem out i.e., identify it as a problem and correct it, a significant amount of wasted time and/or frustration may be avoided.

The present invention preferably employs visual indicators (e.g. lamps, light emitting diodes (LEDs), etc.) to display in a certain way when a SPID is unsuccessfully programmed and, additionally, to specify which SPID was unsuccessful if more than one SPID is used. Simply put, the invention provides a visual feedback for indicating bad SPIDS without the requirement or intervention of computer equipment, software or the knowledge of how to operate a computer and software, thus supporting the unsophisticated installer.

In summary, the present invention identifies errors and minimizes the installation time for an ISDN terminal by providing a computer program-implemented system and method of identification and indication of erroneously programmed SPIDs.

DESCRIPTION OF THE PREFERRED EMBODIMENT

In its preferred embodiment, the present invention provides a system and method of computer program-implemented SPID error identification and indication for an ISDN terminal device. A description of the principles of the ISDN may be found in the following publications, which are incorporated by reference herein: The Basics Book of ISDN, 2nd Edition, Motorola University Press, 1993 and Illustrated ISDN, Bo Lingren & Leif Jonsson, 2nd Edition, Infotrans, P.O. Box 939, S-391 29 Kalmar, Sweden. A terminal adapter into which the present invention may be incorporated is commercially available from Interack Communications, Inc. as its "Route 1" brand terminal adapter, and as disclosed in co-pending application Ser. No. 08/743,222, now U.S. Pat. No. 5,748,628 which is also incorporated herein by reference. Such terminal adapters, and other terminal access devices which incorporate the present invention will include conventional hardware for establishing communication with an ISDN switch, a computing device, a memory, and an application program for establishing and maintaining an ISDN connection. Preferably the computing device is a 16-bit microcontroller, available as a Motorola MC 68302 controller. Conventional application programs for establishing and maintaining communication on an ISDN line are multi-level, multi-tasking programs containing numerous routines and subroutines for processing layer 1, 2 and 3 signals. The standard to which these application program comply are referred to as the CCITT standard, Q.921 and Q.931.

Figure 1:
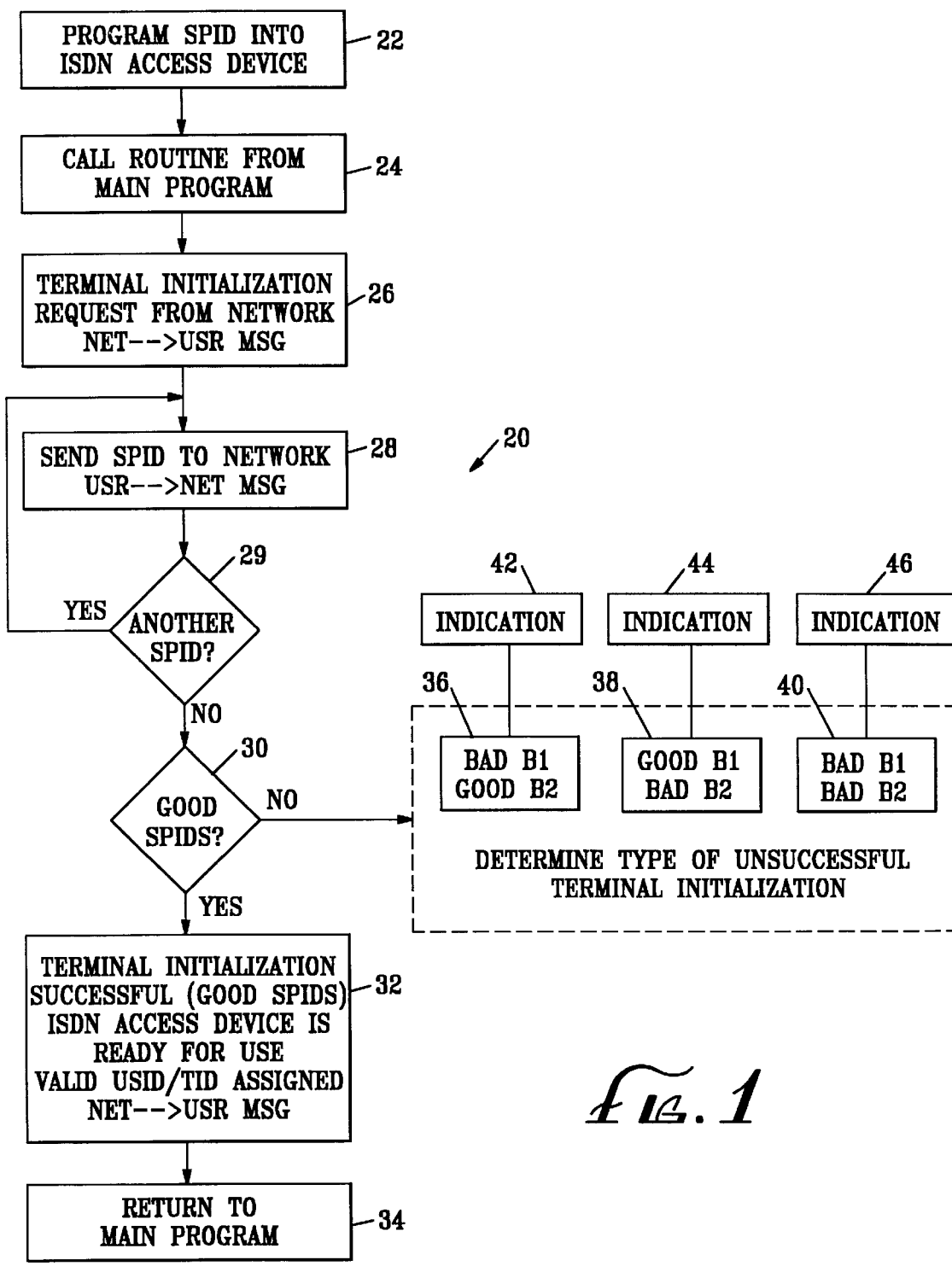
FIG. 1 is a flow chart of programming steps for carrying out a preferred embodiment the present invention.
Figure 2:
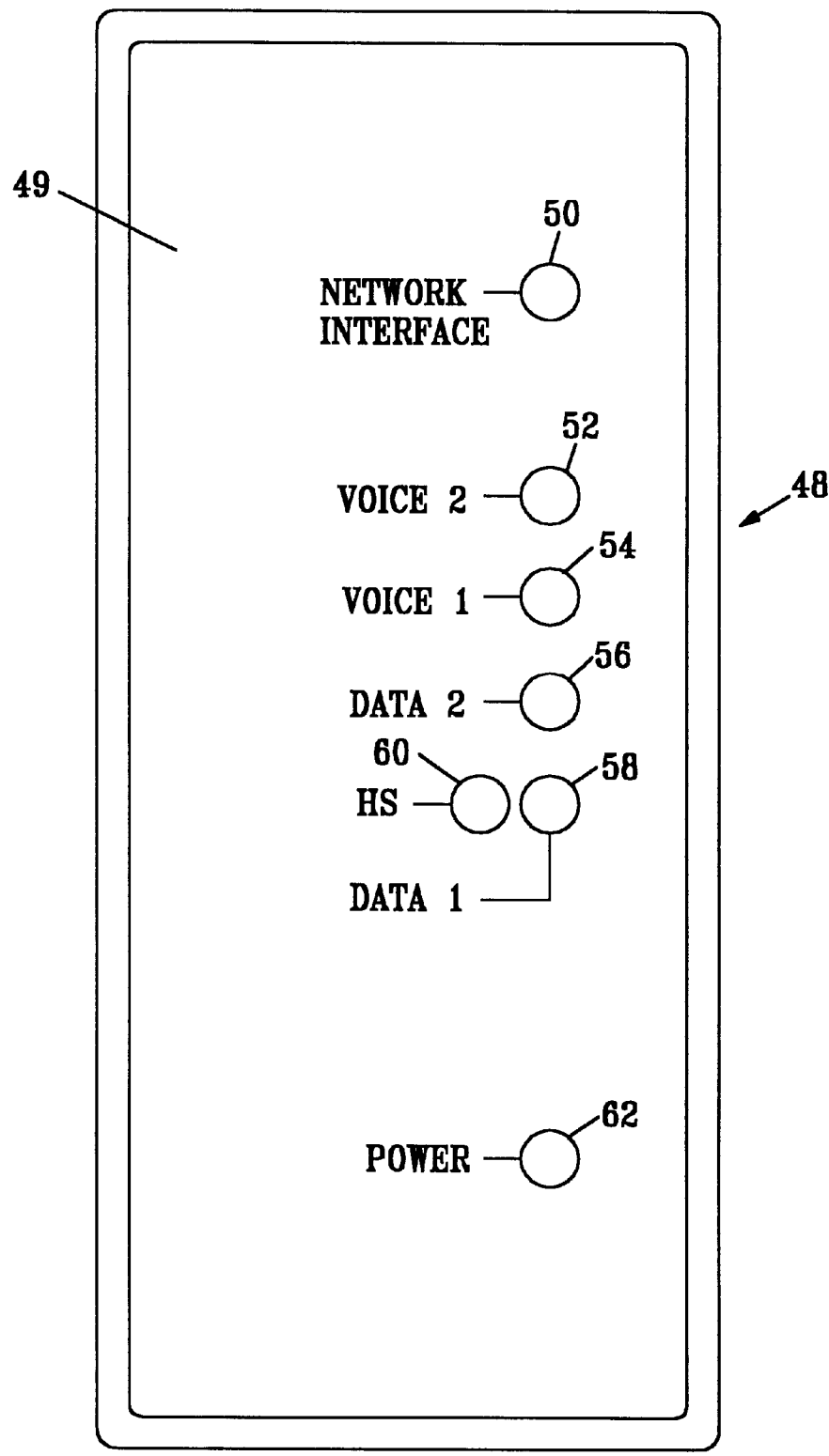
FIG. 2 is an illustration of the front panel of an ISDN terminal device in which a preferred embodiment of the present invention may be incorporated.

Referring to FIG. 1, a flow chart shows the general programming steps for carrying out the present invention. The application program is stored in and executed by a programmable ISDN terminal device, the front panel of which is as shown in FIG. 2 and performs steps shown in FIG. 1 wherein each step is representative of conventional programming techniques. Routine 20 may be initiated by the user or by an interrupt from the main application of the terminal adapter and begins with step 22 in which the installer inputs, keys or otherwise enters the telephone company assigned SPID into an ISDN access device and the routine 20 is called from the main program in step 24. This step is performed with conventional equipment and in a conventional manner.

For the purpose of the present invention, in order to clearly distinguish between the correct and incorrect SPIDs, the correct SPID is defined as the telephone company assigned SPID, and is also referred to herein as a predetermined SPID. This SPID is associated with, but is not the telephone directory number for that line. The SPID which is programmed, keyed or otherwise entered into the subscriber's ISDN access device is referred to as the entered SPID. The entered SPID may be correct, or may be incorrect.

If incorrect, it is referred to as incorrect or as an error. With respect to the present invention, it is intended to be used, preferably, in an ISDN terminal adapter as described in co-pending application Ser. No. 08/743,222, now U.S. Pat. No. 5,748,628 although it may be incorporated into other ISDN access devices.

Once the predetermined SPID has been entered into the device at step 22, and the routine 20 has been called in step 24, then in step 26 a conventional request during the terminal initialization procedure is received from the network and processed. This request is labeled "NET→USR MSG" to indicate that the direction of this message is from the network to the user. The device responds, step 28, by transmitting the programmed SPID to the network, with a message labeled "USR→NET MSG" to indicate that the direction of the message is from the user to the network. Because the ISDN connection typically has two SPIDs, the routine checks to determine whether another SPID has been sent to the network at step 29. If the answer is yes, then the routine returns to step 28. In the case of only a single SPID, or in the case of the last SPID, such as the second SPID in a two-DN connection, the decision at step 29 will be "no", and the routine will advance to step 30. The network then, in step 30, evaluates the message, compares the programmed, transmitted SPID to the telephone company assigned SPID, and responds by indicating whether the programmed SPID is a good SPID or not. If the programmed SPID is good, the network sends, in step 32, the valid "USID/TID" message. The label "NET→USR MSG" indicates that the direction of the message is from the network to the user. If the programmed SPID is not good, a conventional message is sent by the network to the device to indicate a failure to initialize the terminal. Although this message is conventional, it may differ from one manufacturer's switch to another's. The program will, in steps 36, 38 and 40, determine the type of failure of the network to transmit a good SPID as unsuccessful terminal initialization, i.e., whether and which SPID is incorrect. In step 36, the existence of an incorrect DN1 SPID and correct DN2 SPID is determined; in step 38 the existence of a correct DN1 SPID and an incorrect DN2 SPID is determined; and in step 40 the existence of an incorrect DN1 and DN2 SPID is determined. A return to main program step 34 occurs after successful initialization. This routine is repeated each time a SPID is programmed. The routine may, of course, be modified to incorporate steps for determination of only one or more than 2 SPID numbers.

Once the routine 20 has determined that an entered SPID is incorrect, it provides an indication of the error for that particular SPID in steps 42, 44 and 46. Preferably, and as will be described in detail below, the indication is visual, by illumination of light emitting diodes (LED), in various colors, combinations and sequences, on the front panel of the ISDN access device. In this way, the present invention provides positive feedback that is easy to recognize by unsophisticated users or installers. This requires no additional equipment or expertise to determine what is wrong.

Referring to FIG. 2, an ISDN access device 48, having front panel 49, is shown. Visual indicators are preferably of the light emitting diode (LED) type. From top down the following LED indication lights are provided: "Network Interface" 50; "Voice 2" 52; "Voice 1" 54; "Data 2" 56; "Data 1" 58; and, adjacent "HS" 60; and "Power 62". "Voice 1" refers to the V1 analog phone jack; "Voice 2" refers to the V2 analog phone jack; and "Data 1" and "Data 2" refer to the corresponding serial data connectors D1 and D2.

In the present example, both of the voice LEDs, one for each analog phone jack, are colored yellow, and the data LEDs are colored green. The LED's are conventional, with the colors chosen as a matter of convenience. Programming the software to energize the LEDs in various combinations, in various sequences and for various times in response to the error indication described above in regard to FIG. 1 may be done with conventional programming techniques.

Figure 3:
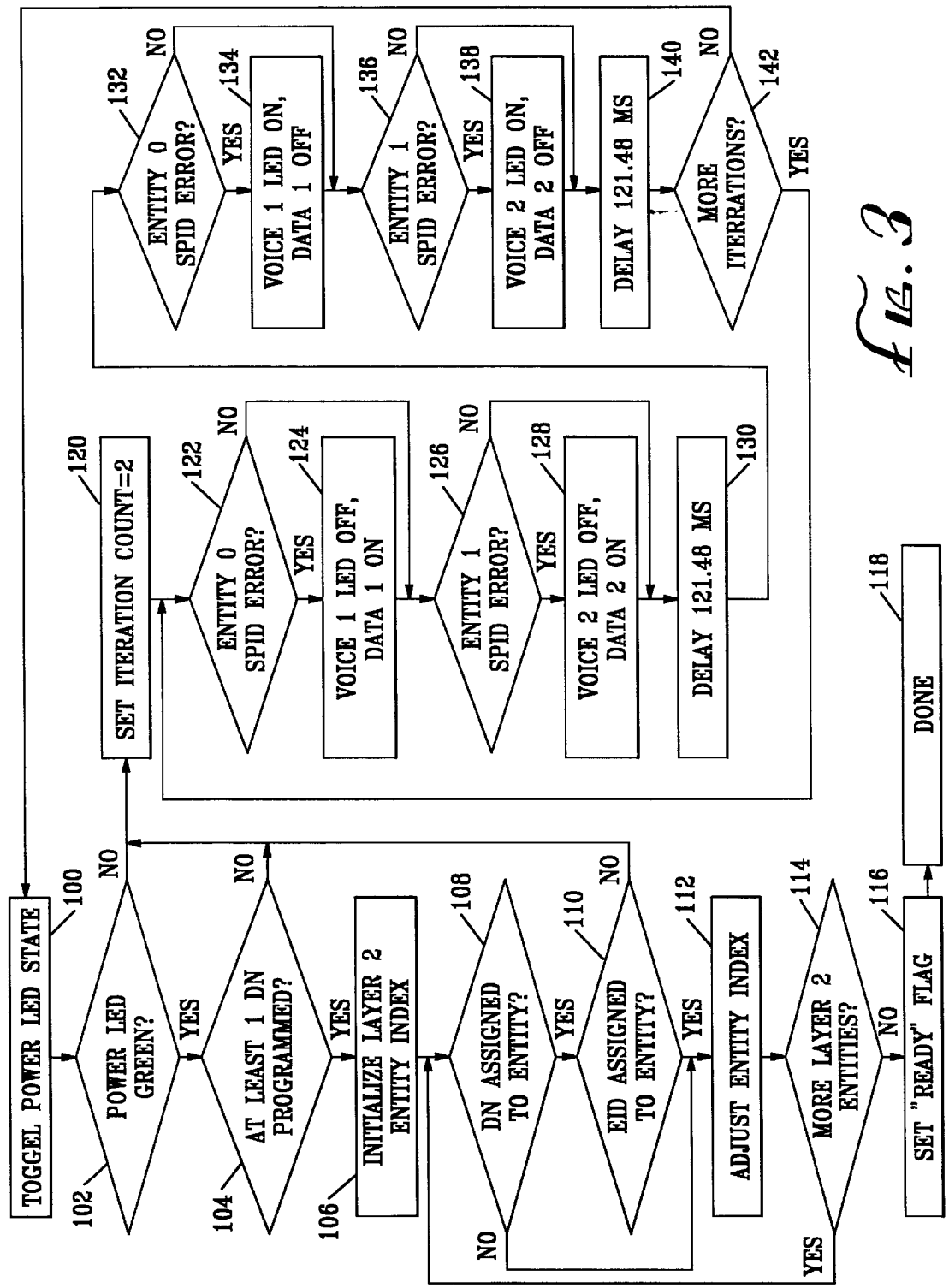
FIG. 3 is a flow chart of programming steps for carrying out a most preferred embodiment of the present invention.

Referring to FIG. 3, a flow chart of programming steps for carrying out a specific, most preferred implementation of the present invention will be described.

In the FIG. 3 routine, after each power-up self-test is performed, the power LED is toggled at step 100. Each time the LED is turned green, step 102, the routine checks to see if the device has become ready, using the following criteria:

1. At least one DN has been programmed into the unit; and
2. An EID has been assigned for each programmed DN.

If both of the above conditions are met, as described in the various programming steps below, the routine suspends itself indefinitely, leaving the power indicator LED 62 in the green state.

So long as the above conditions are not met, the routine remains in a loop, toggling the state of the power LED, step 100, in a 485.92 millisecond ("ms") period. Each of these 485.92 ms period intervals is divided into four equal periods of 121.48 ms each. At the beginning of each 121.48 ms period, the routine tests the status that would indicate receipt of an "illegal SPID error message" and toggles the state of the corresponding pair of the illegal SPID indicator LEDs if the message has been received. After setting the appropriate LED states, or doing nothing in the case where no "illegal SPID" message was received, the routine then suspends itself for a period of 121.48 ms.

Referring again to FIG. 3, if the power LED is green, step 102, then the routine checks to determine whether at least one DN has been programmed. If the power LED is not green, then the routine goes to step 120, which will be described below. At step 104, the routine checks to determine whether at least one DN has been programmed, and if not, the routine goes to step 120. If at least one DN has been programmed, the routine then goes to step 106, and initializes the layer 2 entity index. In the FIG. 3 implementation of the present invention, designed for use on a ISDN basic rate application, there typically are two entities at layer 2, that is, there are two bearer channels, each of which is associated with a unique DN and a corresponding, unique SPID. For purposes of the present invention, each of these pairs is referred to as an "entity", and, in this case, then, the layer 2 entity index would have a value of two, i.e., 0, 1, because there are two entities. As will be appreciated, the present invention may be programmed to incorporate virtually any number of entities, with two being the most common. In the case of an ISDN primary rate application, the number of entities typically could be up to 23, and, consequently, the entity index in such a case would have a value of 23, i.e., 0, 1, 2 . . . 22.

Referring again to FIG. 3, after the entity index has been initialized at step 106, the routine checks to determine whether a DN has been assigned to the entity at step 108. If yes, then the routine checks, in step 110, whether an EID has been assigned to the entity. It is in step 110 that the existence of a SPID error is determined, because an EID is assigned by the telephone company only if the SPID entered into the device is correct, that is, without error. During the initialization procedure, the SPID that has been entered into the device is sent to the telephone company switch, and if correct, the telephone company switch then returns an EID. Hence, in step 110, a "yes" answer indicates that the SPID programmed by the installer has been programmed correctly and the routine moves to the next step 112.

Referring back to step 108, if no DN has been assigned to the entity, then the routine simply skips to step 112. For example, in a two entity application, and the case where only one of two possible DNs was assigned, the program would skip over step 110 for that entity for which no DN had been assigned, and then, at step 112, would adjust, or advance the entity index to the next entity number.

If, at step 110 no EID was assigned to the particular entity whose index was active, then the program would skip to step 120.

At step 112 the entity index is adjusted, or advanced one, and at step 114, the routine checks to determine whether another layer 2 entity is present. If the answer is no, such as the case in a two entity application after the second entity has been checked, the program advances to step 116, where the "ready" flag is set for the next power up and iteration of the routine. After step 116, step 118, referred to as "Done" indicates that the task goes into suspension until the next power-up self-test takes place. At step 114, if there are more layer 2 entities to be checked, the program returns to step 108 and determines whether a DN has been assigned to the next entity in the index.

Referring to step 120, the routine begins an iteration, which as shown in FIG. 3, the iteration count has been set to equal to 2. As indicated above, step 120 in the routine is triggered by a "no" answer at decision steps 102, 104 or 110.

In the series of steps within the first iteration, started at step 120, the routine checks the first entity, referred to in step 122 as "Entity 0 SPID Error?" If the answer is "yes", then, at step 124, the Voice 1 LED 54 is turned off and the Data 1 LED 58 is turned on. If there is no SPID error in Entity 0, then the routine skips step 124 and proceeds to step 126. In step 126, a SPID error for entity 1, i.e., the second of a two entity application, wherein the entity index has a value of 2, that is, 0, 1, is determined. If there is no SPID error for entity 1, then the routine skips to step 130. If there is a SPID error for entity 1, then the routine goes to step 128, in which the Voice 2 LED 52 is turned off and the Data 2 LED 56 is turned on.

Step 130 is a delay of 121.48 ms. Next, at step 132 the presence of an entity 0 SPID error will cause the routine to move to step 134 at which the Voice 1 LED 54 is turned on and the Data 1 LED 58 is turned off. If there is no SPID error for entity 0, then the routine skips step 134 and goes to step 136, in which the presence of a SPID error in entity 1 causes the Voice 2 LED 52 to go on and the Data 2 LED 56 to be turned off, at step 138. If there is no entity one SPID error, in step 136, then the routine skips step 138 and goes to step 140, another 121.48 ms delay.

After the delay, the routine either repeats steps 122 through 140, or, if the device has been reprogrammed, there has been a loss of power, or the ISDN line has been removed, returns to step 100 upon the power-up self-test.

In the case of an erroneously programmed entity 1 or entity 2 SPID i.e., one of the two SPIDs programmed for a two DN line, the SPID error indicating sequence of flashing lights would continue until the problem was corrected by reprogramming the SPID, and running the routine again. Once both SPIDs have been properly programmed, the telephone company switch would assign an EID for each of the entities, and step 120 would not be reached.

With reference to FIG. 3, and assuming an illegal SPID condition, the correspondence of illegal SPID LEDs to the four 121.48 ms periods is as follows:

| Period | Channel One Yellow | Channel One Green | Channel Two Yellow | Channel Two Green |
|---|---|---|---|---|
| 1 | Off | On | Off | On |
| 2 | On | Off | On | Off |
| 3 | Off | On | Off | On |
| 4 | On | Off | On | Off |

With reference to the above table, and FIG. 3, it is apparent that the LEDs for each channel, i.e., entity, are only flashed if the routine has set a status indicating receipt of a bad SPID. Also, the EID assignment and the SPID error indication are mutually exclusive, so that the task can never exit the LED flash loop, i.e., steps 120–142, by detecting a valid EID assignment.

Once an illegal SPID message has been received, the LED's will continue to flash until the unit is unplugged, the unit is reset or the user programs in a new SPID. In the event that the SPID is reprogrammed, the unit will do a software reset at step 142 and the whole process will repeat.

Also, as will be appreciated by those skilled in this art, the term "layer 2" refers to the layer 2 as set forth in the CCITT standard. Layer 2 signals typically relate to the terminal initialization protocol or procedure. Although some messages of the type referred to in the present invention may be termed as layer 2, or layer 3 signals or messages, they may be neither layer 2 nor layer 3 messages. For example, in the particular implementation illustrated in FIG. 3, the actual layer 3 task corresponding to the present invention is programmed to automatically set a "SPID Error" status whenever an "illegal SPID" message is received. This action is distinct from the routine, as shown in FIG. 3, that flashes the LEDs, and thus, is not included in the FIG. 3 flow chart. As may be appreciated, the FIG. 3 flow chart routine is part of a multi-tasking program in which multiple actions take place simultaneously. Thus, if a flow chart for the relevant portion of the layer 3 code were created it would be simply two boxes: a decision box or step "Bad SPID message?"; and an action box, i.e., "Set 'Bad SPID' Status", with the "NO" decision path skipping the action box. Accordingly, it will be appreciated that the LEDs for each channel or "entity" are only flashed if it's layer 3 has set the status indicating receipt of a bad SPID message.

Set forth below are several examples of types of errors that the present invention will detect and how this present invention operates in each instance.

EXAMPLE 1

Correct SPID Numbers Entered for Two Directory Numbers

Consider a first example whereby the SPID number associated with the first directory number and the SPID associated with the second directory number are correctly entered. The first directory number is often referred to as the DN1 directory number, as for example, number (805) 738-0396. In this particular example, the SPID number associated with that first directory number is 0173803960. The DN2 directory number is (805) 738-0397, and its associated SPID number is 0173803970.

The first directory number is the telephone number for that particular line. It's the number assigned by the telephone company and is found in the telephone directory. For each telephone or directory number, there is an associated SPID. The SPID can be of various lengths and various formats, but there is a unique SPID associated with each assigned directory number. In order to make a proper connection, the SPID must be correctly programmed or entered into the ISDN access device. The correct SPID number is required to make an outgoing call. As indicated above, the importance of this invention is to be able to quickly and visually alert the installer when he/she has incorrectly programmed the SPID for a given directory number.

With respect to this example of use of the preferred embodiment of the invention, the routine 20 has been programmed into the processor of the terminal adapter 48 using conventional programming techniques, to provide specific, predetermined indications when the DN1 and DN2 SPIDs have been correctly entered. When the SPIDs have been entered by the installer and the ISDN terminal adapter has been energized, the following sequence will take place: First, the Network Interface LED 50 will flash green fast, i.e., 8 times per second to indicate that the conventional layer one initialization protocol is not complete.

Second, fast flashing LED 50 will slow down to 1 flash per second, if and when it the layer 1 protocol has been completed. The 1 flash per second is used in the presently preferred terminal adapter. Other colors and other timing may be programmed. For instance, a solid green LED may be used to indicate that the layer 1 protocol has been successfully completed. Also, and simultaneously, the Power LED 62 will flash orange and green, at one cycle per second, and will continue to flash orange and green in this cycle, indicating that the conventional layer 2 protocol has not been completed. If and when not only the layer 1, but also the layer 2 protocol has been successfully completed for both SPIDs, then the Power LED 62 will change to a solid, i.e., unblinking, green color.

If and when the SPIDs associated with the first assigned directory number and the second assigned directory number are correctly programmed, then the visual indication is that the Network Interface LED 50 will flash green slowly, the Power LED 62 will be steady green, and the Data 1, Data 2, Voice 1 and Voice 2 LEDs will be off.

EXAMPLE 2

DN1 Channel Entered SPID Incorrect

In example 2, the telephone company assigned SPID number associated with the directory number for the DN1 channel has been incorrectly entered, such as 0713803960 (transposition error). In this example, the terminal adapter 48 will perform its conventional protocol and, upon successful completion of the level 1 protocol, the Network Interface LED 50 will blink green slowly. The Power LED 62 will alternately flash green and orange, and then the Voice 1 LED 54 and Data 1 LED 58, which indicate line 1, will be flashing alternately green and yellow to indicate that the installer has incorrectly programmed the SPID associated with the first directory number.

EXAMPLE 3

DN2 Channel Entered SPID Incorrect

In the next example, the SPID associated with the first directory number has been correctly entered. However, the SPID associated with the second directory number has been incorrectly programmed, such as 0173893970 ("fat finger" error). In this instance, the terminal adapter 48 will eventually, after going through its initialization procedure, show a flashing green at the Network Interface LED 50, indicating that the level 1 protocol has successfully been completed. The Power LED 62 will blink alternatively orange and green. The Voice 2 LED 52 and Data 2 LED 56 will flash, or blink, alternatingly (yellow for Voice 2 and green for Data 2) to indicate that the SPID associated with the second directory number has been incorrectly entered.

EXAMPLE 4

Both Entered SPIDs Incorrect

In this example, the SPID associated with the first directory number, such as 073803960 (missing digit error) and the SPID associated with the second directory number, such as 01173893970 (extra digit error) have been entered incorrectly. In this case, for the preferred embodiment, the LED visualization is as follows: the Network Interface LED 50 flashes slowly to indicate that the level 1 protocol has been successfully completed. The Power LED 62 flashes alternately orange and green. Then, all of the Voice 1, Voice 2, Data 1 and Data 2 LEDs flash alternately in a specific sequence. The two yellow Voice 1 and Voice 2 LEDs flash simultaneously while the Data 1 and Data 2 LEDs are off, and then the two green Data 1 and Data 2 LEDs flash simultaneously while the Voice 1 and Voice 2 LEDs are off.

This invention does not specifically identify which digit of the SPID is incorrect, nor does it provide the exact SPID number. It provides immediately, visual indication when the telephone company assigned SPID number has been incorrectly entered so that other sources of the communication failure can be ruled out. It isolates this problem from other problems so that this problem can be corrected and removed as a barrier to the communication. It is assumed that the correct SPID number has been provided by the telephone company to the person who enters the SPID number into the device. In the case of a SPID error indication, the installer simply reviews the telephone company assigned SPID number, re-enters it, and continues to do so until the correct visual indications are observed.

It will be understood that certain features and subcombinations are of utility and may be employed without reference to other features and sub-combinations as they are outlined within the claims. While the preferred embodiment and application of the invention have been described, it is apparent to those skilled in the art that the objects and features of the present invention are only limited as set forth in the claims attached hereto.

We claim:

1. A system for determining an erroneously entered predetermined Service Profile Identifier (SPID) in an Integrated Services Digital Network (ISDN) telephone network comprising:
    a computing device having a memory;
    an application program, for execution in the computing device, for performing a terminal initialization procedure for an ISDN connection;
    a routine in said application program for comparing a SPID entered into said computing device to a predetermined SPID and determining a condition of whether said SPID entered is identical to said predetermined SPID; and
    an physical indication of said condition.

2. The system of claim 1 wherein said physical indication includes a light source.

3. The system of claim 1 wherein said physical indication includes a plurality of light emitting diodes.

4. The system of claim 1 wherein said physical indication includes a sound source.

5. A computer-implemented method of identification of error in entering a predetermined Service Profile Identifier (SPID) in an Integrated Services Digital Network (ISDN) telephone network comprising:
    obtaining a first predetermined SPID assigned to a first directory number;
    entering said first predetermined SPID into an ISDN access device connected to the network on said first directory number to create a first entered SPID;
    receiving a terminal initialization request from the network;
    sending said first entered SPID to the network in response to said terminal initialization request;
    comparing said first entered SPID with said first predetermined SPID;
    if said first entered SPID is identical to said first predetermined SPID, then indicating successful terminal initialization;
    if said first entered SPID is not identical to said first predetermined SPID, then indicating unsuccessful terminal initialization.

6. The method of claim 5 wherein the step of indicating unsuccessful terminal initialization includes illumination of at least one light source.

7. The method of claim 5 wherein the step of indicating unsuccessful terminal initialization includes illumination of at least one light emitting diode.

8. The method of claim 5 wherein the step of indicating unsuccessful terminal initialization includes activation of at least one sound source.

9. An Integrated Services Digital Network (ISDN) terminal access device for establishing communication on an ISDN line and for determining an erroneously entered predetermined Service Profile Identifier (SPID) comprising:
    a computing device having a memory;
    an application program, for execution in the computing device of an ISDN terminal initialization procedure;
    a routine in said program for entering a first SPID into said memory, for comparing said first SPID to a first predetermined SPID and for determining whether said first SPID is identical to said first predetermined SPID;
    a visual indicator including a plurality of light emitting diodes (LEDs), whereby at least one of said LEDs is illuminated upon determination that said first SPID is not identical to said first predetermined SPID.

10. The device of claim 9 wherein:
    said routine is adapted for also entering a second SPID number into said memory, for comparing said second SPID to a second predetermined SPID and for determining whether said second SPID is identical to said predetermined SPID; and
    at least one of said LEDs is illuminated upon determination that said first SPID is not identical to said first predetermined SPID and/or upon determination that said second SPID is not identical to said second predetermined SPID.

\* \* \* \* \*